(12) United States Patent
Long et al.

(10) Patent No.: US 8,980,992 B2
(45) Date of Patent: Mar. 17, 2015

(54) LOW RADIO FREQUENCY LOSS, STATIC DISSIPATIVE ADHESIVES

(75) Inventors: Lynn Edward Long, Manhattan Beach, CA (US); Randall Jay Moss, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 1009 days.

(21) Appl. No.: 12/397,804

(22) Filed: Mar. 4, 2009

(65) Prior Publication Data

US 2010/0227964 A1  Sep. 9, 2010

(51) Int. Cl.
| | |
|---|---|
| *C08K 3/04* | (2006.01) |
| *C08L 79/00* | (2006.01) |
| *C09J 179/00* | (2006.01) |
| *C09J 179/04* | (2006.01) |

(52) U.S. Cl.
CPC . *C09J 179/04* (2013.01); *C08K 3/04* (2013.01)
USPC ............................ 524/496; 524/495; 524/589

(58) Field of Classification Search
USPC ......................................... 524/495, 496, 589
See application file for complete search history.

(56) References Cited

U.S. PATENT DOCUMENTS

| | | | | |
|---|---|---|---|---|
| 4,110,364 | A * | 8/1978 | Gaku et al. | 528/170 |
| 4,871,811 | A | 10/1989 | Gaku et al. | |
| 5,223,106 | A * | 6/1993 | Gerace et al. | 204/488 |
| 5,291,254 | A * | 3/1994 | Shimada et al. | 399/46 |
| 5,789,757 | A * | 8/1998 | Husson et al. | 252/183.11 |
| 6,172,128 | B1 * | 1/2001 | Lau et al. | 521/77 |
| 6,482,521 | B1 | 11/2002 | Lee et al. | |
| 6,827,218 | B1 * | 12/2004 | Dick et al. | 206/720 |
| 2005/0238889 | A1 * | 10/2005 | Iwamoto et al. | 428/446 |
| 2006/0096449 | A1 | 5/2006 | Williams et al. | |
| 2006/0210806 | A1 * | 9/2006 | Nelson | 428/422 |

FOREIGN PATENT DOCUMENTS

| | | |
|---|---|---|
| EP | 1594351 | 11/2005 |
| EP | 1594351 A2 * | 11/2005 |
| JP | 2001089654 A * | 4/2001 |
| JP | 2001244387 A * | 9/2001 |

OTHER PUBLICATIONS

Machine Translation of JP 2001-244387.*
Machine Translation of JP 2001-089654.*
Partial Spot Translation of JP 2001-244387, obtained Dec. 8, 2010.*
Partial Spot Translation of JP 2001-089654, obtained Dec. 8, 2010.*
Mitsubishi Chemical—Carbon Black Data Sheet—http://www.carbonblack.jp/en/product/list2_01.html#ma100.*
Degussa Printex XE2 Technical Information Sheet—Published-Feb. 15, 2005 http://2.imimg.com/data2/TT/VJ/MY-2835588/carbon-black.pdf.*
Mitsubishi Chemical—Carbon Black Data Sheet—Copyright—2006—Downloaded—Jul. 5, 2014 http://www.carbonblack.jp/en/product/list2_01 .html#ma100.*
Wada—JP 2001-244387 A—machine translation.*
Degussa Printex XE2 Technical Information Sheet—Published—Feb. 15, 2005 http://2.imimg.com/data2/TT/VJ/MY-2835588/carbon-black.pdf.*
European Search Report, European Application No. 10154518.4; 5 pages (Apr. 1, 2010).

* cited by examiner

*Primary Examiner* — Ling Choi
*Assistant Examiner* — Ronald Grinsted
(74) *Attorney, Agent, or Firm* — Thompson Hine LLP

(57) ABSTRACT

An adhesive including an amorphous carbon dispersed in a cyanate ester resin, wherein the adhesive has static dissipative properties and low radio frequency loss properties.

20 Claims, 2 Drawing Sheets

LOW RADIO FREQUENCY LOSS, STATIC DISSIPATIVE ADHESIVES

FIELD

The present patent application relates to synthetic resins and, more particularly, to low radio frequency loss, static dissipative adhesives.

BACKGROUND

Due to random electro-static discharges, all metal parts on a spacecraft are typically grounded to bleed off static charges, thereby avoiding catastrophic damage to the surrounding electronic hardware. For example, a space radar antenna is typically comprised of a plurality of radio frequency ("RF") radiating elements, commonly referred to as patches, that are supported by lightweight foam tiles. These patches, which are typically made from metal, must be grounded.

One known technique for grounding RF radiating patches to lightweight foam tiles involves the use of conductive mechanical fasteners, such as metal pins. Such conductive mechanical fasteners secure the patches to the lightweight foam tiles while at the same time providing a conductive path for dissipating static charges. However, conductive mechanical fasteners add complexity to the design and are not practical for use with non-conductive lightweight foam tiles.

An alternative technique for grounding RF radiating patches to lightweight foam tiles involves the use of conductive adhesives. Conductive adhesives are attractive because they simplify the manufacturing process due to their ease of use. Furthermore, like conductive metal fasteners, they secure (i.e., bond) the patches to the lightweight foam tiles while at the same time providing a conductive path for dissipating static charges. However, the large quantities (e.g., 5 to 10 percent by weight) of conductive fillers, such as carbon powder, graphite, ceramic and metal, in conductive adhesives impart the adhesives with high RF loss properties and, therefore, cannot be used in applications, such as space radar antenna, that require low RF loss.

Accordingly, there is a need for a static dissipative adhesive that has low RF loss properties.

SUMMARY

In one aspect, the disclosed low loss static dissipative adhesive may include an amorphous carbon dispersed in a cyanate ester resin.

In another aspect, the disclosed low loss static dissipative adhesive may include a quantity of carbon black dispersed in a cyanate ester resin, the quantity being such that the carbon black comprises at least about 0.1 percent by weight of the adhesive and at most about 2 percent by weight of the adhesive.

Other aspects of the low loss static dissipative adhesives of the present disclosure will become apparent from the following description, the accompanying drawings and the appended claims.

DETAILED DESCRIPTION

Figure 1:
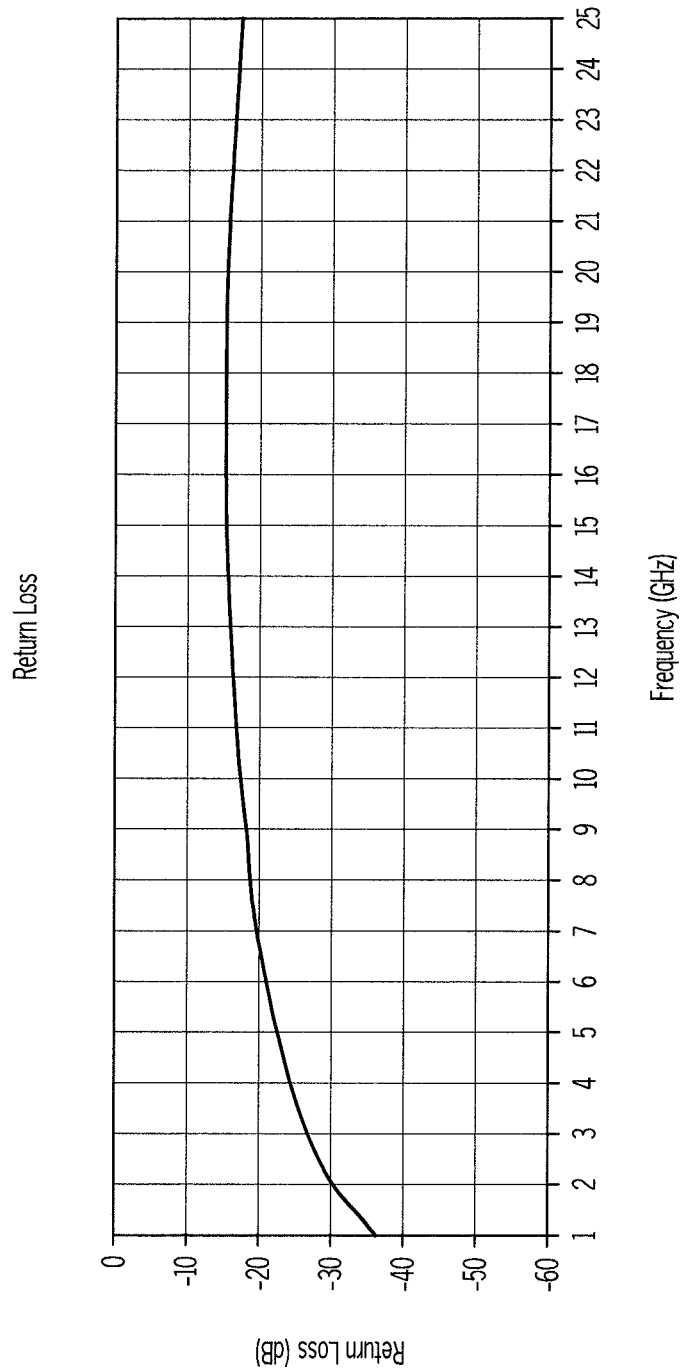
FIG. 1 is a graphical illustration of return loss versus frequency for an exemplary low loss static dissipative adhesive in accordance with the present disclosure.

It has now been discovered that adhesives prepared by dispersing relatively small quantities of amorphous carbon in a cyanate ester resin exhibit desired electrical conductivity and low RF loss properties.

In one aspect, the amorphous carbon useful in the formulations of the present disclosure may be any amorphous carbon having a relatively low average particle size and relatively high surface area. Those skilled in the art will appreciate that typical low average particle sizes for amorphous carbon may range from several microns to several nanometers. For example, the amorphous carbon in the formulations of the present disclosure may have an average particle size of about 1000 nanometers or less, or 500 nanometers or less, or 250 nanometers or less, or 100 nanometers or less, or 50 nanometers or less, or 30 nanometers or less.

In one particular aspect, the amorphous carbon useful in the formulations of the present disclosure may be carbon black. An example of a useful and commercially available carbon black is PRINTEX® XE2, which is available from Evonik Industries (formerly Degussa) of Essen, Germany. PRINTEX® XE2 carbon black has an average particle size of about 30 nanometers and a surface area of about 910 square meters per gram. Other useful commercially available carbon black pigments will be readily apparent to those skilled in the art.

At this point, those skilled in the art will appreciate that the average particle size of commercially available amorphous carbons may be further reduced by mechanical processing. For example, PRINTEX® XE2 carbon black may be milled with ceramic media to achieve an average particle size of less than 30 nanometers.

The cyanate ester resins useful in the formulations of the present disclosure may be any thermosetting resin wherein the hydrogen atom of a hydroxyl group (—OH) is substituted with a cyanide group (—CN) to form a cyanate ester group (—OCN). For example, the cyanate ester resins may be bisphenol-A-based or novolac-based cyanate ester resins. An example of a useful and commercially available cyanate ester resin is EX-1515 resin, which is available from TenCate Advanced Composites USA, Inc. of Morgan Hill, Calif.

The disclosed low loss static dissipative adhesives may be prepared by dispersing the amorphous carbon in the cyanate ester resin. A solvent, such as methyl ethyl ketone or toluene, may be used to reduce the viscosity of the resin to assist in dispersing the amorphous carbon therein. Furthermore, solvent may be used to adjust the viscosity of the resulting adhesive depending on whether a liquid adhesive, a paste adhesive or a film adhesive is desired.

The amount of amorphous carbon in the adhesive may depend on design considerations, including the required amount of electrical conductivity required and the amount of RF loss that may be tolerated. In one aspect, the disclosed adhesives may include at least about 0.1 percent by weight amorphous carbon and at most about 2 percent by weight amorphous carbon. In another aspect, the disclosed adhesives may include at least about 0.1 percent by weight amorphous carbon and at most about 1.5 percent by weight amorphous carbon. In another aspect, the disclosed adhesives may include at least about 0.1 percent by weight amorphous carbon and at most about 1.0 percent by weight amorphous carbon. In another aspect, the disclosed adhesives may include at least about 0.1 percent by weight amorphous carbon and at most about 0.5 percent by weight amorphous carbon.

At this point, those skilled in the art will appreciate that additional components may be included in the adhesive formulation, including additional pigments and resins, without departing from the scope of the present disclosure. Furthermore, a substrate material, such as fiber, may also be added to the adhesive formulation to form a composite material without departing from the scope of the present disclosure.

Specific examples of the disclosed low loss static dissipative adhesive are set forth below.

EXAMPLES 1-8

Eight adhesives were prepared by dispersing various quantities of PRINTEX® XE2 carbon black in EX-1515 cyanate ester resin. Solvent was added to the formulation to reduce the viscosity of the adhesives such that the adhesives may be sprayed with a pneumatic spray gun. The resulting adhesives were then either sprayed or poured onto a D-shaped comb pattern circuit having a 20 mil spacing and the electrical resistance was measured. The results are set forth in Table 1 below:

TABLE 1

| Example | Percent Carbon (by weight) | Application Method | Electrical Resistance (Ohms) |
|---|---|---|---|
| 1 | 1.20 | Sprayed | $<10^5$ |
| 2 | 0.80 | Sprayed | $<10^5$ |
| 3 | 0.55 | Sprayed | $<10^5$ |
| 4 | 0.50 | Poured | $<10^5$ |
| 5 | 0.40 | Sprayed | $<10^5$ |
| 6 | 0.40 | Poured | $<10^5$ |
| 7 | 0.28 | Sprayed | $2.2 \times 10^5$ |
| 8 | 0.13 | Sprayed | $6.0 \times 10^8$ |

Thus, Examples 1-8 confirm that adhesives prepared with relatively low quantities (e.g., less than 1 percent by weight) amorphous carbon in cyanate ester resin provided electrical conductivity sufficient to effectively dissipate static charges.

EXAMPLES 9-19

Eleven adhesives were prepared by dispersing various quantities of PRINTEX® XE2 carbon black in EX-1515 cyanate ester resin. Solvent was added to the formulation to reduce the viscosity of the adhesives such that the adhesives may be sprayed with a pneumatic spray gun. The resulting adhesives were then either sprayed or poured onto a trace to trace circuit having 15 millimeter spacing and the electrical resistance was measured. The results are set forth in Table 2 below:

TABLE 2

| Example | Percent Carbon (by weight) | Application Method | Electrical Resistance (Ohms) |
|---|---|---|---|
| 9 | 1.20 | Sprayed | $3.0 \times 10^5$ |
| 10 | 0.80 | Sprayed | $4.5 \times 10^5$ |
| 11 | 0.55 | Sprayed | $1.2 \times 10^6$ |
| 12 | 0.50 | Poured | $1.2 \times 10^6$ |
| 13 | 0.40 | Sprayed | $1.1 \times 10^7$ |
| 14 | 0.40 | Poured | $8.0 \times 10^6$ |
| 15 | 0.28 | Sprayed | $1.6 \times 10^7$ |
| 16 | 0.28 | Sprayed | $1.4 \times 10^7$ |
| 17 | 0.28 | Sprayed | $1.2 \times 10^7$ |
| 18 | 0.28 | Sprayed | $1.3 \times 10^7$ |
| 19 | 0.13 | Sprayed | $3.0 \times 10^{10}$ |

Thus, Examples 9-19 also confirm that adhesives prepared with relatively low quantities (e.g., less than 1 percent by weight) amorphous carbon in cyanate ester resin provided electrical conductivity sufficient to effectively dissipate static charges.

EXAMPLE 20

Using an appropriate mixer, 1 gram of PRINTEX® XE2 carbon black was dispersed in 249 grams of EX-1515 cyanate ester resin to yield an adhesive having 0.40 percent by weight carbon black. The viscosity of the adhesive was adjusted and the resulting formulation was sprayed onto a DI-STRATE™ 95225 syntactic foam tile having a thickness of 0.1375 inches. DI-STRATE™ 95225 syntactic foam tiles are commercially available from Aptek Laboratories, Inc. of Valencia, Calif.

Figure 2:
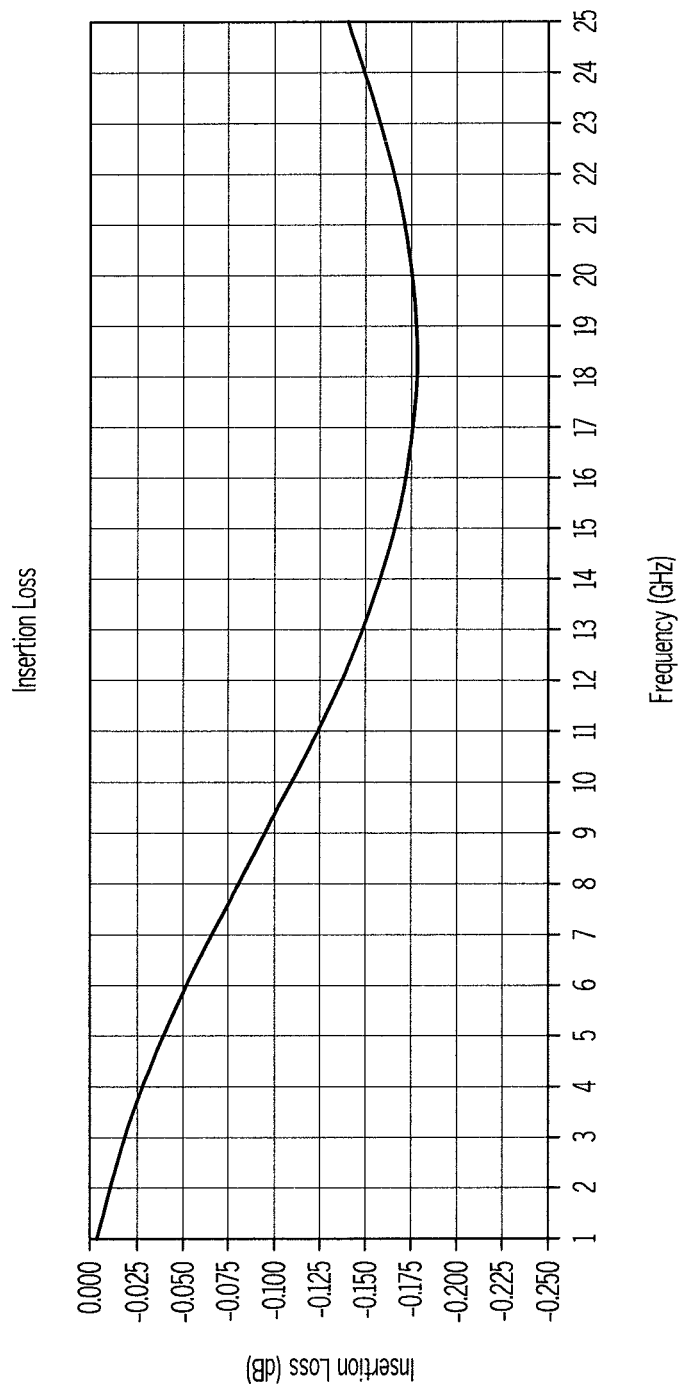
FIG. 2 is a graphical illustration of insertion loss versus frequency for the exemplary low loss static dissipative adhesive of FIG. 1.

The adhesive coated tile had an average dielectric constant of about 1.4 and an average loss tangent of about 0.005 measured at 2 gigahertz when tested at both a vertical and horizontal polarization. The return loss versus frequency of the tile is shown in FIG. 1 and the insertion loss versus frequency of the tile is shown in FIG. 2.

EXAMPLE 21

Using an appropriate mixer, 1 gram of PRINTEX® XE2 carbon black was dispersed in 356 grams of EX-1515 cyanate ester resin to yield an adhesive having 0.28 percent by weight carbon black. The viscosity of the adhesive was adjusted and the resulting formulation was sprayed onto a DI-STRATE™ 95225 syntactic foam tile having a thickness of 0.1339 inches.

At a vertical polarization, the adhesive coated tile had an average dielectric constant of about 1.4 and an average loss tangent of about 0.004 measured at 2 gigahertz. At a horizontal polarization, the adhesive coated tile had an average dielectric constant of about 1.4 and an average loss tangent of about 0.005 measured at 2 gigahertz.

EXAMPLE 22

The adhesive of Example 21 was sprayed onto a DI-STRATE™ 95225 syntactic foam tile having a thickness of 0.1367 inches.

At both a vertical and horizontal polarization, the adhesive coated tile had an average dielectric constant of about 1.4 and an average loss tangent of about 0.005 measured at 2 gigahertz.

Accordingly, adhesives prepared by dispersing relatively small quantities of amorphous carbon in a cyanate ester resin pursuant to the present disclosure exhibit desired electrical conductivity and low RF loss properties.

Although various aspects of the disclosed low loss static dissipative adhesives have been shown and described, modifications may occur to those skilled in the art upon reading the specification. The present application includes such modifications and is limited only by the scope of the claims.

What is claimed is:

1. An adhesive consisting of:
    an amorphous carbon dispersed in a cyanate ester resin;
    wherein said amorphous carbon comprises carbon black that has been mechanically processed to an average particle size of less than 30 nm;
    wherein the amorphous carbon comprises at most 2 percent by weight of said adhesive;
    and
    wherein the adhesive with an electrical conductivity that dissipates static charge, the electrical conductivity being between $3.0 \times 10^5$ ohms to $3.0 \times 10^{10}$ ohms.

2. The adhesive of claim 1 wherein said cyanate ester resin is a bisphenol-A-based cyanate ester resin.

3. The adhesive of claim 1 further consisting of a solvent and/or a pigment.

4. The adhesive of claim 1 formulated as a liquid, paste or film.

5. The adhesive of claim 1 wherein said amorphous carbon comprises at most 1.5 percent by weight of said adhesive.

6. The adhesive of claim 1 wherein said amorphous carbon comprises at most 1 percent by weight of said adhesive.

7. The adhesive of claim 1 wherein said amorphous carbon comprises at most 0.5 percent by weight of said adhesive.

8. The adhesive of claim 1 wherein said amorphous carbon comprises at least 0.1 percent by weight of said adhesive.

9. The adhesive of claim 1 wherein said amorphous carbon is present in a quantity sufficient to impart said adhesive with an electrical resistance of at most $10^9$ Ohms.

10. The adhesive of claim 1 wherein said amorphous carbon is present in a quantity sufficient to impart said adhesive with a dielectric constant of about 1.3 to about 1.7 and a loss tangent of at most 0.006, wherein said dielectric constant and said loss tangent are measured at about 2 gigahertz.

11. The adhesive of claim 1 wherein said amorphous carbon is present in a quantity sufficient to impart said adhesive with an electrical resistance of at most $10^7$ Ohms, a dielectric constant of about 1.3 to about 1.7 and a loss tangent of at most 0.006, wherein said dielectric constant and said loss tangent are measured at about 2 gigahertz.

12. An adhesive consisting of:
carbon black having an average particle size of less than 30 nm dispersed in a cyanate ester resin, said carbon black comprising at least 0.1 percent by weight of said adhesive and at most 1 percent by weight of said adhesive; and
wherein said adhesive has a dielectric constant of about 1.3 to about 1.7 when measured at about 2 gigahertz.

13. The adhesive of claim 12 formulated as a liquid, paste or film.

14. The adhesive of claim 12 wherein said carbon is present in a quantity sufficient to impart said adhesive with an electrical resistance of at most $10^9$ Ohms.

15. The adhesive of claim 12 wherein said carbon black is present in a quantity sufficient to impart said adhesive with a loss tangent of at most 0.006, wherein said loss tangent is measured at about 2 gigahertz.

16. The adhesive of claim 1 wherein said amorphous carbon is present in a quantity sufficient to impart said adhesive with an electrical resistance of at most $10^9$ Ohms, and a loss tangent of at most 0.006, wherein said loss tangent is measured at about 2 gigahertz.

17. The adhesive of claim 1 wherein said carbon black has been milled with ceramic media.

18. The adhesive of claim 1 wherein said carbon black has a surface area of about 910 square meters per gram.

19. The adhesive of claim 12 wherein said carbon black has been milled with ceramic media and has a surface area of about 910 square meters per gram.

20. The adhesive of claim 1 further consisting of a substrate material in contact with the adhesive thereby forming a composite material.

\* \* \* \* \*